United States Patent
Rice

[19]

[11] Patent Number: 6,030,016
[45] Date of Patent: Feb. 29, 2000

[54] REBOUND CUSHION FOR BODY MOUNT

[75] Inventor: Bernie W. Rice, Thorndale, Canada

[73] Assignee: The Standard Products Company, Cleveland, Ohio

[21] Appl. No.: 09/304,005

[22] Filed: Apr. 30, 1999

[51] Int. Cl.[7] .................................................. B62D 24/02
[52] U.S. Cl. .......................................................... 296/35.1
[58] Field of Search ............................................ 296/35.1

[56] References Cited

U.S. PATENT DOCUMENTS

| | | |
|---|---|---|
| 1,871,963 | 8/1932 | Dill . |
| 2,208,709 | 7/1940 | Tjaarda . |
| 2,769,656 | 11/1956 | Lee . |
| 2,838,339 | 6/1958 | Schaldenbrand . |
| 2,976,080 | 3/1961 | Moore . |
| 3,159,391 | 12/1964 | Wilfert et al. . |
| 3,250,565 | 5/1966 | Jaskowiak ............................. 296/35.1 |
| 3,479,081 | 11/1969 | Schaaf . |
| 3,622,194 | 11/1971 | Bryk . |
| 3,809,427 | 5/1974 | Bennett . |
| 3,927,730 | 12/1975 | Winslow ............................. 296/35.1 |
| 3,990,737 | 11/1976 | Palmer . |
| 4,012,071 | 3/1977 | Jones et al. . |
| 4,014,588 | 3/1977 | Kohriyama . |
| 4,407,491 | 10/1983 | Kunihiro et al. . |
| 4,783,039 | 11/1988 | Peterson et al. . |
| 4,921,203 | 5/1990 | Peterson et al. . |
| 5,103,529 | 4/1992 | König . |
| 5,121,905 | 6/1992 | Mann et al. . |
| 5,127,698 | 7/1992 | König . |
| 5,158,269 | 10/1992 | Hein et al. . |
| 5,170,985 | 12/1992 | Killworth et al. . |
| 5,178,433 | 1/1993 | Wagner . |
| 5,248,134 | 9/1993 | Ferguson et al. . |
| 5,409,283 | 4/1995 | Ban . |
| 5,551,661 | 9/1996 | Bunker . |
| 5,580,028 | 12/1996 | Tomczak et al. . |
| 5,722,631 | 3/1998 | Dorton . |
| 5,743,509 | 4/1998 | Kanda et al. . |
| 5,746,411 | 5/1998 | Bruas et al. . |

*Primary Examiner*—Gary C. Hoge
*Attorney, Agent, or Firm*—Harness, Dickey & Pierce, P.L.C.

[57] ABSTRACT

A rebound cushion for a body mount is disclosed. The rebound cushion includes an outer cushion formed from an elastomeric material having a first durometer. The rebound cushion also includes an inner cushion formed from an elastomeric material having a second durometer, wherein the first durometer of the outer cushion is higher than the second durometer of the inner cushion. A clamp disk maintains the inner cushion in contact with the outer cushion. The outer cushion may include an annular lip for retaining the clamp disk. The separate inner cushion allows a vertical cushioning rate defined by the inner cushion to be designed and/or tuned independently from the lateral cushioning rate.

22 Claims, 5 Drawing Sheets

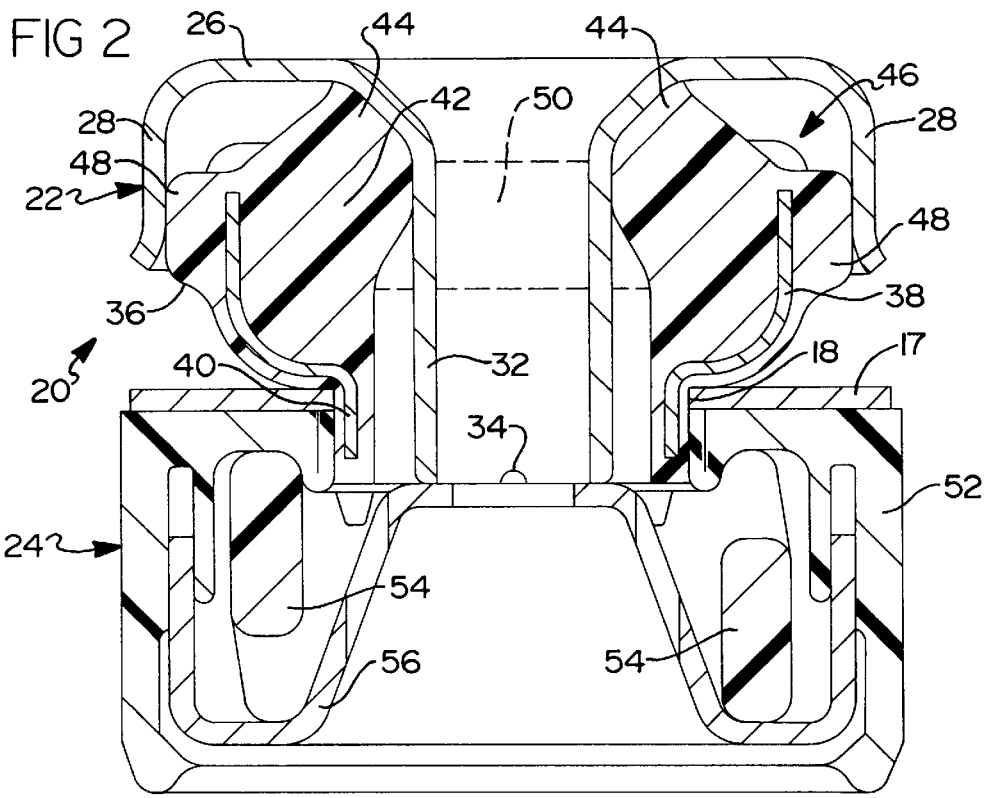
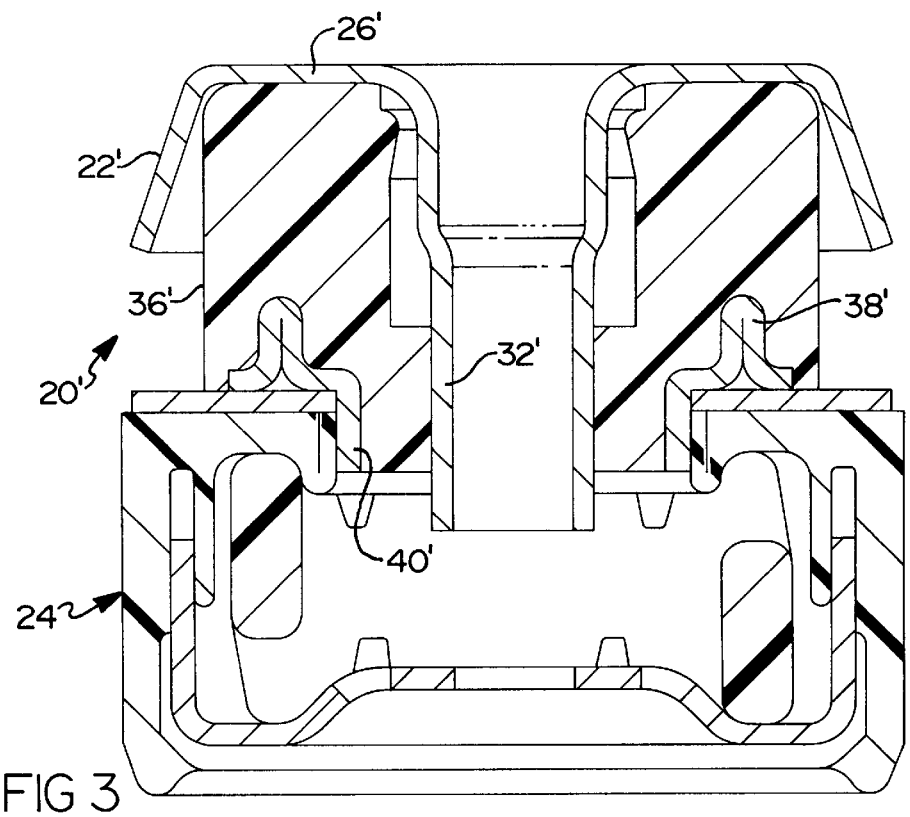

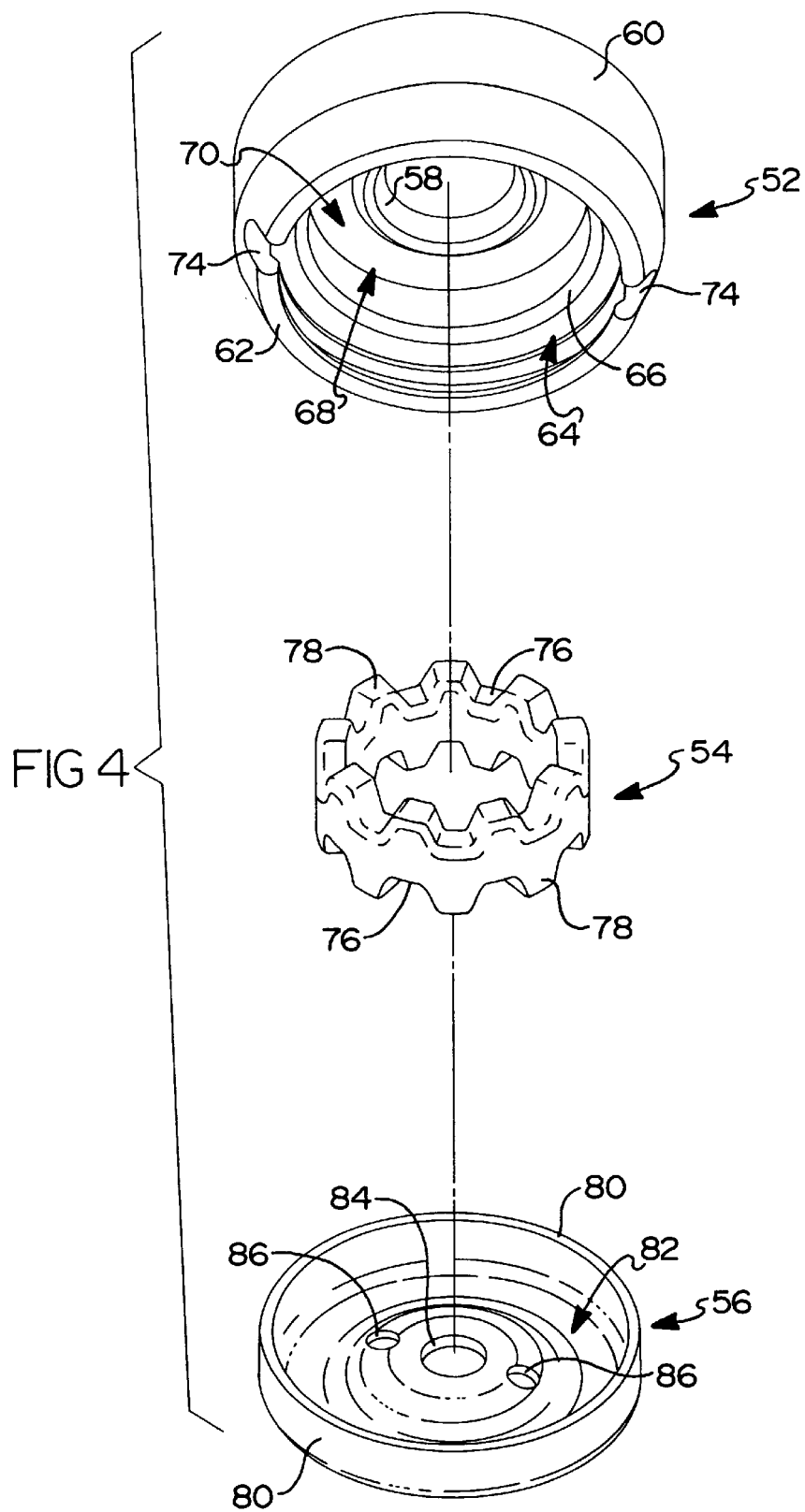

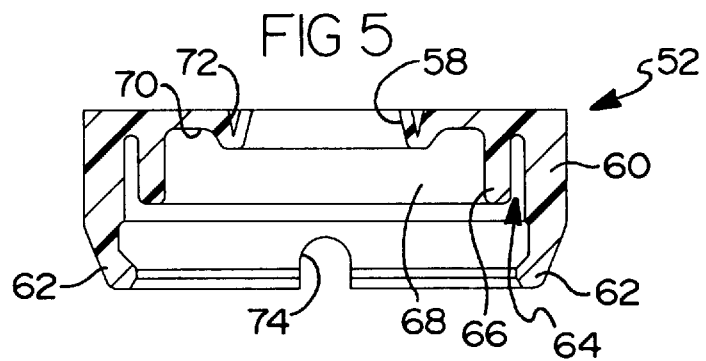
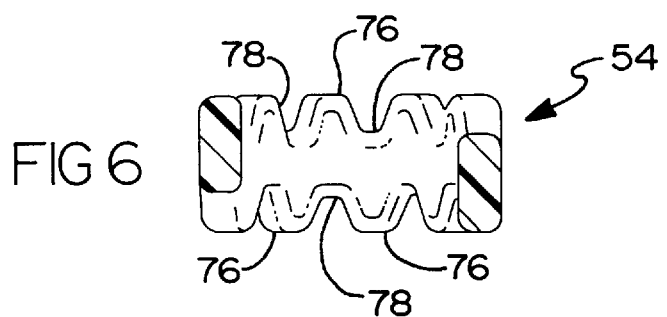
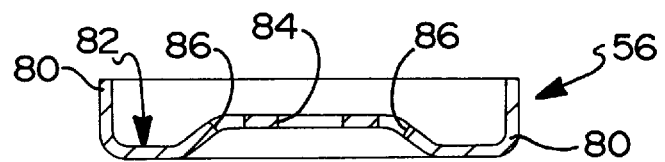

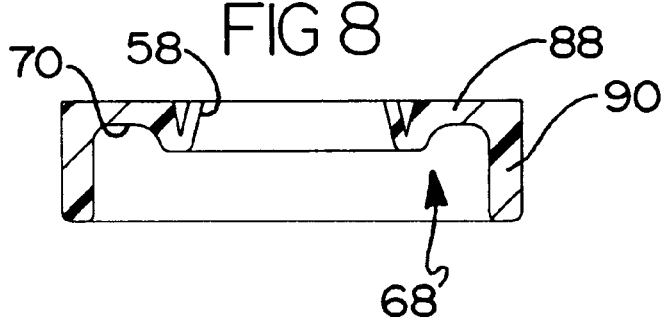
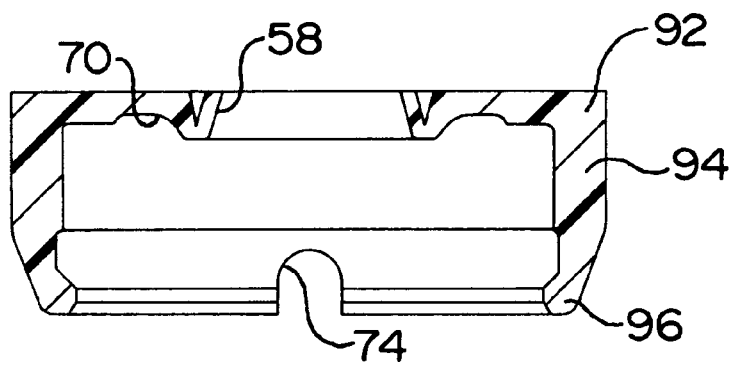

REBOUND CUSHION FOR BODY MOUNT

BACKGROUND OF THE INVENTION

1. Technical Field

The present invention is directed to a rebound cushion for an automotive vehicle or truck. More particularly, the present invention is directed to a rebound cushion assembly used in conjunction with a vehicular body mount in which the vertical cushioning rate and the lateral cushioning rate may be tuned independently from each other.

2. Discussion

Automotive vehicles, and especially trucks are typically equipped with a body mount disposed between the vehicle body and the vehicle frame. The body mount provides additional cushioning between the vehicle body and frame. The body mount also serves to isolate the transmission of vibration energy and impact energy from the vehicle suspension and frame up through the vehicle body.

A rebound cushion is typically used in conjunction with the body mount for providing additional cushioning and vibration damping characteristics. A variety of rebound cushions have been developed for different types of vehicle applications. Most of these rebound cushion designs include an elastomeric member which is captured by a support structure for securing the rebound cushion in relation to the body mount. The elastomeric member may be formed from a variety of plastic or rubber materials.

One example of a simple compression style rebound cushion is a circular or annular elastomeric member which is retained in place by a metal plate and suitable fastener. The durometer of the elastomeric member can be chosen for tailoring the characteristics of the rebound cushion. However, this compression style rebound cushion is stiff vertically and soft laterally; including both side to side and fore/aft lateral directions. A particular disadvantage of this simple rebound cushion design is that it does not provide firm lateral support for the vehicle body with respect to the frame. Thus, the vehicle body is able to move in the side to side and fore/aft directions with respect to the frame. This soft lateral support can allow excessive motion laterally with respect to the vehicle frame which results in poor shake control of the vehicle.

An additional disadvantage of this compression style rebound cushion design is that stiffening the lateral cushioning rate produces a firm vertical cushioning rate which absorbs less energy and provides a harsher ride. Moreover, this rebound cushion design typically has a vertical to lateral cushioning rate ratio of approximately 3:1 (vertical:lateral), allows only minimal tuning of the vertical rate with respect to the lateral rate, and limited options for designing the vertical rate independently from the lateral rate. Accordingly, this type of rebound cushion provides limited design flexibility to a vehicle ride control engineer in designing the rebound cushion for use on a variety of vehicles.

In the design of vehicle suspension systems, it is becoming more common to require the rebound cushion and body mount to have a soft vertical cushioning rate for enhancing ride comfort, and a firm lateral (meaning both side to side and fore/aft) cushioning rate for providing increased vehicle stability and control. However, this desired feature typically requires a rebound cushion and sometimes a body mount in which the vertical cushioning rate and the lateral cushioning rate can be tuned or designed independently from each other.

In view of the disadvantages associated with the prior art rebound cushion and body mount designs, it is desirable to provide a rebound cushion which has a soft vertical cushioning rate and a firm lateral cushioning rate. It is further desirable to provide a rebound cushion which has a vertical to lateral cushioning rate of 1:2, 1:3 or greater, while still maintaining a soft vertical rate. Finally, it is desirable to provide a rebound cushion having a low cost retaining feature so that all of the components forming the rebound cushion assembly can be retained in a preassembled state without the use of a fastener or adhesive.

SUMMARY OF THE INVENTION

The present invention is directed to a rebound cushion for a vehicular body mount. The rebound cushion includes an outer cushion formed from an elastomeric material having a first durometer. The rebound cushion also includes an inner cushion formed from an elastomeric material having a second durometer, wherein the first durometer of the outer cushion is higher than the second durometer of the inner cushion. A clamp disk maintains the inner cushion in contact with the outer cushion. The outer cushion may include an annular lip for retaining the clamp disk. The separate inner cushion allows a vertical cushioning rate defined by the inner cushion to be designed and/or tuned independently from the lateral cushioning rate.

BRIEF DESCRIPTION OF THE DRAWINGS

The various advantages of the present invention will become apparent to one skilled in the art by reading the following specification and appended claims, and by referencing the following drawings in which:

FIG. 2 is a cross-sectional view of the rebound cushion assembly of the present invention shown with a first body mount design;

FIG. 3 is a cross-sectional view of the rebound cushion assembly of the present invention shown with a second body mount design;

FIG. 4 is an exploded perspective view of the rebound cushion assembly in accordance with a preferred embodiment of the present invention;

FIG. 5 is a cross-sectional view of the outer cushion associated with the rebound cushion assembly of FIG. 4;

FIG. 6 is a cross-sectional view of the inner cushion associated with the rebound cushion assembly of FIG. 4;

FIG. 7 is a cross-sectional view of the clamp disk associated with the rebound cushion assembly of FIG. 4;

FIG. 8 is a cross-sectional view of the outer cushion associated with an alternate preferred embodiment of the present invention;

FIG. 9 is a cross-sectional view of the outer cushion associated with another alternate preferred embodiment of the present invention;

DETAILED DESCRIPTION OF THE PREFERRED EMBODIMENTS

Figure 1:
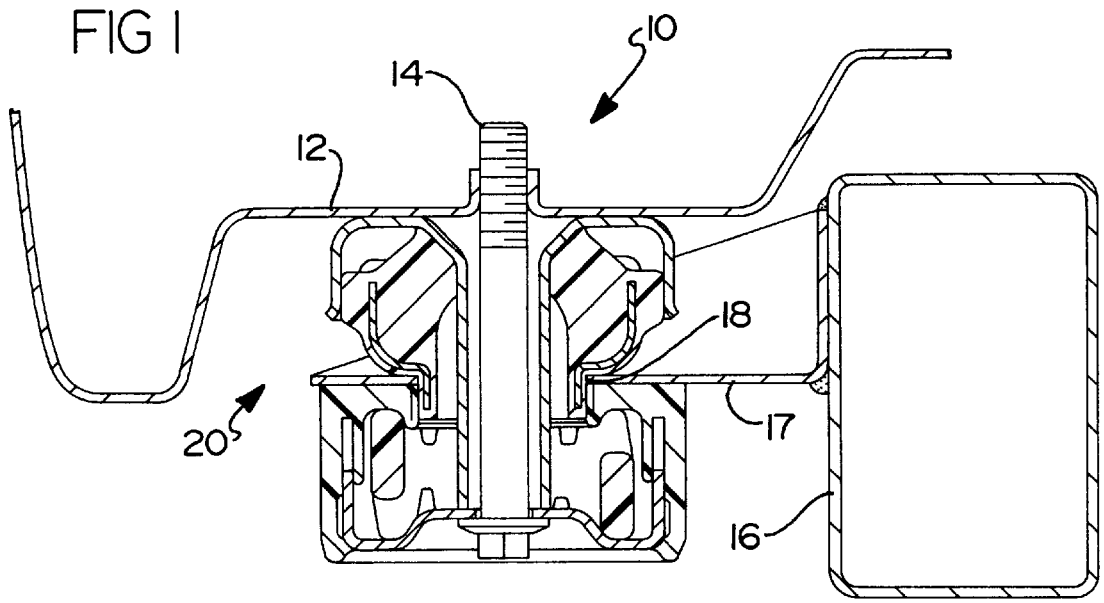
FIG. 1 is a cross-sectional view of an exemplary vehicle frame design showing a body mount utilizing the rebound cushion assembly of the present invention.

In accordance with the teachings of the present invention, a rebound cushion for a body mount is disclosed. The rebound cushion design allows for independent vertical and lateral cushion rates. FIG. 1 illustrates an exemplary vehicle frame system 10 having a vehicle body 12 which is mounted to a vehicle frame 16 with a body mount 20. The vehicle frame 16 includes a pedestal bracket 17 welded thereto. An aperture 18, which is preferably elliptical in shape, is formed within the pedestal bracket 17. The components forming the body mount 20 are disposed on opposite sides of the pedestal bracket 17. A suitable retaining bolt 14 secures the body mount 20 between the body 12 and the pedestal bracket 17.

Referring now to FIG. 2, the rebound cushion 24 in accordance with a preferred embodiment of the present invention is shown with an exemplary body mount 20. The body mount 20 generally includes an upper member 22 and a lower member, such as rebound cushion assembly 24, which are disposed on opposite sides of the vehicle frame 16. The upper member 22 includes a helmet 26 which fits over and through a upper cushion assembly 36. The top portion of the helmet 26 is defined by four ears 28 having slightly flared ends, and four cutout portions (not shown) between each of the four ears 28. The combination of the ears 28 and the cut out portions allows the helmet 26 to be efficiently stamped from a square steel blank. The helmet 26 also includes a stem 32 which forms a central aperture for accommodating the retaining bolt 14 (FIG. 1). The base of the stem 32 includes an opposing pair of notches 34 which allow any water which collects within the stem 32 to properly drain through the body mount 20.

The upper cushion assembly 36 is formed around a circular metal collar 38 having an elliptical base 40 which fits within a corresponding elliptical aperture 18 formed within the vehicle frame 16. This elliptical fit feature forces the mount to be installed in the correct orientation within the vehicle. An elastomeric upper cushion 42 is formed within the collar 38. The shape of the upper cushion 42 defines an upper cushion leg 44 which is designed for engaging the inner surface of the helmet 26 when the upper member 22 is assembled. A set of four outer pads 46 are formed in opposing pairs about the outside circumference of the upper cushion assembly 36. As disclosed, the outer pads 46 may be designed to include separately shaped opposing pairs of lateral pads 48 and fore/aft pads 50.

The metal collar 38 may also be formed to have a square or rectangular outer dimension, also preferably with an elliptical base. As part of this configuration, the helmet 26 is also formed to have a corresponding square or rectangular outer dimension, and the inner surface of the four ears 28 have a flat surface for engaging the square or rectangular upper cushion 36. A particular advantage of this alternate configuration is that a square or rectangular upper cushion 36 and generally square or rectangular outer pads 46 resist rotating with respect to a corresponding square or rectangular helmet 26.

During the manufacturing of the upper cushion assembly 36, the metal collar 38 is coated with an adhesive material. The elastomeric material forming the upper cushion 42 and the outer pads 46 is then molded around the collar 38 into the desired size and shape. The adhesive material serves to permanently bond the elastomeric material to the collar 38. The preferred method for forming the upper cushion assembly 36 is through high pressure injection molding. However, it should be understood that other molding processes, such as transfer or compression molding processes can also be employed for forming the elastomeric components of the rebound cushion and body mount. As part of the present invention, it is also contemplated that two different types or durometer of rubber or elastomeric material can be used for forming the upper cushion 36 and thus designing its dynamic properties. Alternatively, it is possible to mold the upper cushion 42 separately from the metal collar 38 and outer pads 46, and then sub-assemble these components after molding. This technique easily allows two different types or durometer of rubber or elastomeric material to be employed for the inner cushion 42 and the outer pads 46, allowing increased tuning flexibility.

An alternate upper member design which can be used with the rebound cushion assembly 24 of the present invention is shown in FIG. 3. The upper member 22' generally includes a metal helmet 26' which fits over an upper cushion assembly 36'. As shown, the upper cushion assembly 36' is formed by an annular elastomeric upper cushion 42' which is molded to a circular metal collar 38'. The metal collar 38' also has an elliptical base 40' which fits within the elliptical aperture 18 formed within the vehicle frame 16. As will be appreciated from the following description, the rebound cushion assembly 24 of the present invention may be used with either of the upper member designs 22, 22' for tailoring the characteristics of the body mount.

With reference to FIGS. 2–4, the rebound cushion assembly 24 according to a preferred embodiment of the present invention is shown. The rebound cushion assembly 24 generally includes an outer cushion 52, an inner cushion 54, and a clamp disk 56 which can be pre-assembled as a unitary component prior to installation on the vehicle. As will be appreciated, the clamp disk 56 and its central body can take on a variety of configurations for engaging and/or aligning with the helmet stem 32 or 32'.

The individual components forming the rebound cushion assembly 24 associated with the preferred embodiment of the present invention are shown in FIGS. 5–7. More specifically, FIG. 5 discloses a cross-sectional view of the outer cushion 52, which is preferably injection molded from an elastomeric material such as a thermoplastic elastomer, natural rubber, EPDM or butyl. The structure of the outer cushion 52 is defined by an outer wall 60. An annular lip 62 is molded into the bottom of the outer wall 60 which allows the clamp disk 56 to be snapped into position and retained within the outer wall 60 of the outer cushion 52.

Through the injection molding process or a similar process, an outer channel 64 is formed between a molded inner wall 66 and the outer wall 60 of the outer cushion 52. As shown, the diameter of the annular lip 62 is less than that of the outer channel 64. The molded inner wall 66 is also annular in shape, and forms a cylindrical inner cavity 68. An inner channel 70 is also molded into the body of the outer cushion 52. The combination of the inner cavity 68 and the inner channel 70 function to maintain the inner cushion 54 in an optimal position. As will be described below, the inner cushion 54 can take on a variety of shapes and materials depending upon the rebound cushion application. Accordingly, the inner cavity 68 and the inner channel 70 can also take on a variety of shapes in order to accommodate the shape of the inner cushion 54.

A central aperture 58 which may be circular or elliptical in shape is formed through the body of the outer cushion 52 for receiving the base 40 of a suitably designed upper cushion assembly 36. An annular groove 72 is molded around the outer circumference of the central aperture 58. The annular groove 72 functions to locate or seat the outer cushion 52 around the base 40. An opposing pair of cutouts 74 are formed in the outer wall 60 of the outer cushion 52. The cutouts 74 function to reduce the required effort to insert the clamp disk 56.

The particular features of the inner cushion 54 associated with the rebound cushion assembly 24 are shown in cross section in FIG. 6. The annular body of the inner cushion 54 includes alternating support ridges 76 and V-shaped notches 78 formed along the top and bottom surfaces. As shown, each support ridge 76 is disposed directly opposite a corresponding notch 78. The alignment of the support ridges 76 and notches 78 functions to allow the inner cushion 54 to be compressed to approximately one half its full height during the rebound stroke of the rebound cushion assembly 24 and body mount 20. It is preferred that the elastomeric material used for the inner cushion 54 is selected to have a durometer which is softer (or less) than the durometer of the elastomeric material forming the outer cushion 52. This feature assists in producing a soft vertical cushioning rate. The inner cushion 54 is dimensioned to fit within the inner cavity 68 of the outer cushion 52 yet still provide room to bulge and expand. The design of the inner cushion 54 can take on a variety of forms and is not limited to the disclosed shape or description herein, as the purpose of the inner cushion 54 is to provide an elastomeric cushion which produces a soft vertical cushion rate.

The inner cushion 54 is retained within the outer cushion 52 by the metal clamp disk 56 having its outside diameter defined by an annular wall 80. During the stamping process, an annular channel 82 is formed within the clamp disk 56 which assists the inner cushion 54 in maintaining its proper shape during compression. A central aperture 84 is also formed within the clamp disk 56 for receiving a suitable body mount retaining bolt 14. The clamp disk 56 also includes a pair of opposing drain holes 86 for allowing any water collecting within the center of the body mount 20, 20' to properly drain. As will be appreciated, the clamp disk 56 can take on a variety of configurations for aligning the inner cushion 54, and engaging and/or aligning with the helmet stem 32, 32'.

The completed assembly for an exemplary body mount 20, including the rebound cushion assembly 24 is shown in FIG. 2. As will be appreciated, the rebound cushion assembly 24 provides a firm lateral cushion rate due in part because the outer cushion 52 has a stiff outer wall 60 for resisting the lateral movements of the clamp disk 56. Additionally, the rebound cushion assembly 24 provides a soft vertical cushion rate because of the lower compression resistance provided by the softer durometer of the inner cushion 54, and because the annular wall 80 of the clamp disk 56 is able to move vertically within the outer channel 64 of the outer cushion 52. Thus, the features of the rebound cushion assembly 24 and the body mount 20 also allow the vertical cushioning rate to be softer than the lateral cushioning rate.

More specifically, the outer cushion 52 is preferably formed from an elastomeric material having a durometer of approximately 90, and the inner cushion 54 is preferably formed from an elastomeric material having a durometer of approximately 45. Thus, in the preferred embodiment, the outer cushion 52 has a durometer which is higher than the durometer of the inner cushion 54.

Referring now to FIGS. 8–11, alternate embodiments of the outer cushion and the inner cushion of the present invention are shown. FIG. 8 shows the outer cushion 88, which is similar to outer cushion 52, except that the outer wall 60 is removed in order to make the outer cushion 88 less stiff in the lateral directions. As shown, the outer cushion 88 includes an inner wall 90 for engaging and guiding the inner surface of the annular wall 80 of the clamp disk 56.

FIG. 9 shows yet another configuration, embodied in the outer cushion 92, in which the inner wall 66 is removed. As shown, the outer wall 94 and annular lip 96 remain in tact for engaging and guiding the outer surface of the annular wall 80 of the clamp disk 56. The annular lip 96 also retains the claim disk 56 as described above. This modification also serves to make the outer cushion 92 less stiff in the lateral direction. As will be appreciated, the clamp disk 56 is able to move vertically with respect to the outer cushions 88, 92 as described above.

Figure 12:
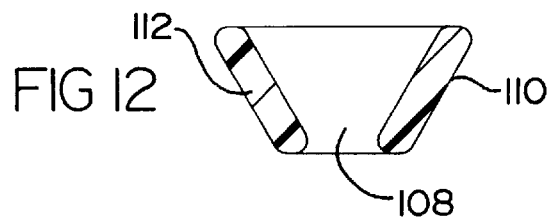
FIG. 12 is a cross-sectional view of the inner cushion associated with another alternate preferred embodiment of the present invention.
Figure 10:
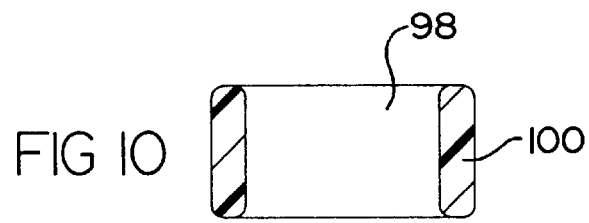
FIG. 10 is a cross-sectional view of the inner cushion associated with an alternate preferred embodiment of the present invention.
Figure 11:
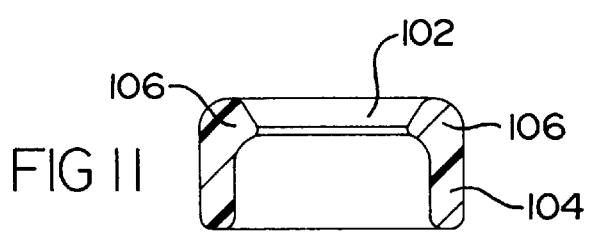
FIG. 11 is a cross-sectional view of the inner cushion associated with another alternate preferred embodiment of the present invention.

FIG. 10 shows an alternate configuration for the inner cushion 98, which is molded as an annular elastomeric cushion having a uniform cross section shown generally at 100. As a result, the inner cushion 98 provides a firmer vertical cushioning rate because the support ridges and V-shaped notches are removed. FIG. 11 shows another configuration, embodied in the inner cushion 102, which is also molded as an annular elastomeric cushion having a uniform cross section shown generally at 104. A particular feature of the inner cushion 102 is the upper leg 106 which is formed about the inner diameter. The upper leg 106 provides additional stiffness to the inner cushion 102 in the vertical direction. FIG. 12 shows yet another configuration, embodied in inner cushion 108, which is also molded as an annular elastomeric cushion having a tapered side wall 110. Inner cushion 108 also has a uniform cross-section shown generally at 112.

Referring back to FIG. 2, the specific details associated with the upper member 22 of the body mount 20 are disclosed. The vertical and lateral cushion rates of the body mount 20 may be designed by changing the shape of the upper cushion assembly 36. The preferred elastomeric material for the upper cushion assembly 36 is butyl. However, natural rubber is also suitable for this application. The vertical cushion rate can be varied by changing the size and shape of the upper cushion 42 and the cushion leg 44. The side to side and fore/aft components of the lateral cushion rate can be independently varied by changing the size and shape of the outer pads 46.

FIG. 2 also shows that the outer pads 46 become pre-compressed between the collar 38 and ears 28 when the helmet 26 is fitted over the upper cushion assembly 36. Also shown is that the cushion leg 44 is pre-compressed through its contact with the inner surface of the helmet 26. As part of the present invention, the dimensions of the outer pads 46 can be varied in order to change the amount of pre-compression of the elastomeric material disposed between the collar 38 and the helmet ears 28. As the distance between the collar 38 and the ears 28 is generally fixed, a wider or larger pad 46 will produce more pre-compression, and thus a firmer cushion rate. A narrower or smaller pad 46 will produce less pre-compression, and thus a softer cushion rate. Additionally, it is contemplated that the opposing pair of lateral pads 48 may have different dimensions than the opposing pair of fore/aft pads 50, and therefore a different amount of pre-compression.

In a similar fashion, the size and shape of the upper cushion 42 and the cushion leg 44 can be designed for controlling the vertical cushioning rate of the mount. A larger cushion leg 44 will produce a firmer vertical cushion rate. A smaller cushion leg 44 will produce a softer vertical cushion rate. Additionally, the angle of the cushion leg 44 relative to the vehicle frame 16 can also be used to control the vertical cushion rate. As the angle with respect to the vehicle frame 16 increases, the vertical cushion rate also increases. As will be appreciated by one skilled in the art, these features of the outer pads 46 and the cushion leg 44 allow the lateral cushion rate of the body mount 20 to be designed or tuned independently from the vertical cushion rate. The design of the outer pads 46 can also be varied so that the side to side lateral cushion rate can be different than the fore/aft lateral cushion rate.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An elastomeric cushion for a body mount comprising:
   an outer cushion member having a wall defining an inner cavity;
   an inner cushion member disposed within the inner cavity; and
   a member for retaining the inner cushion within the inner cavity.

2. The elastomeric cushion of claim 1 wherein the inner cushion member is formed from an elastomeric material having a durometer lower than the durometer of the outer cushion member.

3. The elastomeric cushion of claim 1 wherein the wall of the outer cushion is an annular wall, said annular wall extending perpendicularly from a central portion of the outer cushion member.

4. The elastomeric cushion of claim 3 wherein the annular wall has a retaining lip formed about an inner circumferential surface thereof.

5. The elastomeric cushion of claim 4 wherein the member for retaining the inner cushion member includes an annular wall formed thereon, said annular wall extending perpendicularly from a central body.

6. The elastomeric cushion of claim 5 wherein the annular wall of the member for retaining the inner cushion fits within an inside dimension of the outer cushion member and is retained within the outer cushion member by the retaining lip.

7. The elastomeric cushion of claim 5 wherein the outer cushion member includes and inner wall and an outer wall the iner wall and the outer wall having an annular channel formed therebetween, the annular channel receiving the annular wall of the member for retaining the inner cushion.

8. The elastomeric cushion of claim 1 wherein the member for retaining the inner cushion member includes an annular wall extending perpendicularly from a central body, and the wall of the outer cushion member encircles an outer surface of the annular wall.

9. The elastomeric cushion of claim 1 wherein the member for retaining the inner cushion member includes a annular wall extending perpendicularly from a central body, and the wall of the outer cushion member is disposed within an inner surface of the annular wall.

10. A rebound cushion for a body mount comprising:
    an outer elastomeric member having an outer wall, and an inner wall defining an inner cavity, the outer wall and the inner wall having a channel formed therebetween, and the outer wall and the inner wall defining a lateral cushioning rate;
    an inner elastomeric member disposed within the inner cavity, the inner elastomeric member defining a vertical cushioning rate; and
    a retaining member for contacting the inner elastromeric member and retaining the inner elastomeric member within the inner cavity, the retaining member having an annular wall extending perpendicularly from a central body, wherein the annular wall fits between the outer wall and the inner wall and can move vertically within the channel.

11. The rebound cushion of claim 10 wherein the outer wall provides lateral resistance to circumferential lateral movement of the retaining member for defining a lateral cushioning rate.

12. The rebound cushion of claim 10 wherein the inner wall provides lateral resistance to circumferential lateral movement of the retaining member for defining a lateral cushioning rate.

13. The rebound cushion of claim 10 wherein the outer wall and the inner wall contain the circumferential lateral movement of the retaining member for defining a lateral cushioning rate.

14. The rebound cushion of claim 10 wherein the lateral cushioning rate can be changed independently from the vertical cushioning rate.

15. The rebound cushion of claim 10 wherein the inner elastomeric member is an annular cushion, and wherein the durometer of the annular cushion is lower than the durometer of the outer elastomeric member.

16. The rebound cushion of claim 15 wherein the annular cushion includes a plurality of alternating support ridges and notches formed about the circumference of at least one annular surface.

17. The rebound cushion of claim 10 wherein the inner elastomeric member is an annular cushion having a tapered cross-section, wherein a diameter of a first annular surface is less than a diameter of a second annular surface.

18. A body mount for coupling a vehicle body to a vehicle frame member comprising:
    a first cushion member disposed between the vehicle body and a first side of the vehicle frame member;
    rebound cushion connected to the first cushion member and disposed on a second side of the vehicle frame member, the rebound cushion including:
        an outer cushion member having an outer wall and an inner wall defining an inner cavity, the outer wall and the inner wall forming a channel therebetween;
        an inner cushion member disposed within the inner cavity; and
        a clamp disk for retaining the inner cushion within the inner cavity.

19. The body mount of claim 18 wherein the inner cushion member is formed from an elastomeric material having a durometer lower than the durometer of the outer cushion member.

20. The body mount of claim 18 wherein the outer wall has a retaining lip formed therein, the retaining lip having a diameter which is less than the diameter of the clamp disk for retaining the clamp disk within the channel.

21. The body mount of claim 18 wherein the clamp disk includes an annular wall formed thereon, the annular wall being dimensioned to fit within the channel.

22. The body mount of claim 18 wherein the clamp disk includes at least one aperture for providing drainage of fluid collecting within the body mount.

* * * * *